(12) United States Patent
Axmon et al.

(10) Patent No.: US 8,504,029 B2
(45) Date of Patent: Aug. 6, 2013

(54) MOBILE COMMUNICATION SYSTEM CELL SELECTION IN THE PRESENCE OF UNACCEPTABLE CELLS

(75) Inventors: Joakim Axmon, Kavlinge (SE); Ali Nader, Malmo (SE); Robert Wolfgang Klang, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 69 days.

(21) Appl. No.: 13/193,361

(22) Filed: Jul. 28, 2011

(65) Prior Publication Data
US 2013/0029662 A1 Jan. 31, 2013

(51) Int. Cl.
*H04W 36/00* (2009.01)

(52) U.S. Cl.
USPC .................. 455/434; 455/435.3; 370/312

(58) Field of Classification Search
USPC .................. 455/434, 435.1–435.3, 436, 522; 37/312, 329, 331, 338
See application file for complete search history.

(56) References Cited

U.S. PATENT DOCUMENTS

| 6,223,037 | B1 | 4/2001 | Parkkila | |
|---|---|---|---|---|
| 6,353,645 | B1 | 3/2002 | Solve et al. | |
| 7,027,427 | B1 | 4/2006 | Tamura | |
| 7,308,258 | B2 | 12/2007 | Demir et al. | |
| 8,285,285 | B2 * | 10/2012 | Kitazoe et al. | 455/436 |
| 2008/0125118 | A1 * | 5/2008 | Ormson | 455/434 |
| 2008/0207201 | A1 * | 8/2008 | Fischer | 455/434 |
| 2009/0088154 | A1 * | 4/2009 | Umatt et al. | 455/434 |
| 2009/0239533 | A1 * | 9/2009 | Somasundaram et al. | 455/434 |
| 2010/0062764 | A1 * | 3/2010 | Aiouaz et al. | 455/434 |
| 2010/0130205 | A1 * | 5/2010 | Jung et al. | 455/435.2 |
| 2011/0034168 | A1 | 2/2011 | Lindoff et al. | |
| 2011/0039558 | A1 * | 2/2011 | Lee et al. | 455/434 |
| 2011/0103534 | A1 * | 5/2011 | Axmon et al. | 375/371 |
| 2011/0195712 | A1 * | 8/2011 | Mucke et al. | 455/434 |
| 2011/0319076 | A1 * | 12/2011 | Ramasamy et al. | 455/434 |

(Continued)

FOREIGN PATENT DOCUMENTS

| EP | 2 114 106 A1 | 11/2009 |
|---|---|---|
| EP | 2 117 128 A1 | 11/2009 |
| WO | 2004/066543 A2 | 8/2004 |

OTHER PUBLICATIONS

PCT International Search Report, mailed Sep. 26, 2012, in connection with International Application No. PCT/EP2012/063698.

(Continued)

*Primary Examiner* — Kamran Afshar
*Assistant Examiner* — Khawar Iqbal
(74) *Attorney, Agent, or Firm* — Potomac Patent Group PLLC

(57) ABSTRACT

A user equipment (UE) cell search involves tuning a demodulation frequency of the UE based on signals received from a first encountered cell and using a non-initial cell search procedure to continue searching for a cell that is qualified for camping on, wherein the non-initial cell search procedure relies on the demodulation frequency being within limits of accuracy that enable successful reception and decoding of received information. Prior to finding a qualified cell, information enabling a first discovered unqualified cell to again be found is saved. After a period of time during which the non-initial cell search procedure has been performed and before the UE's demodulation frequency is beyond acceptable limits of accuracy, the saved information is used to again tune the demodulation frequency based on reading signals from the first discovered unqualified cell. The UE then continues to perform the non-initial cell search procedure.

30 Claims, 11 Drawing Sheets

(56) References Cited

U.S. PATENT DOCUMENTS

| | | |
|---|---|---|
| 2012/0071163 A1* | 3/2012 | Klingenbrunn et al. ... 455/435.2 |
| 2012/0196593 A1* | 8/2012 | Jung et al. .................. 455/434 |
| 2012/0225649 A1* | 9/2012 | Yerrabommanahalli et al. .......................... 455/434 |
| 2012/0236920 A1* | 9/2012 | Ben-Eli ..................... 375/226 |
| 2012/0275371 A1* | 11/2012 | Somasundaram et al. .... 370/312 |

OTHER PUBLICATIONS

PCT Written Opinion, mailed Sep. 26, 2012, in connection with International Application No. PCT/EP2012/063698.

* cited by examiner

MOBILE COMMUNICATION SYSTEM CELL SELECTION IN THE PRESENCE OF UNACCEPTABLE CELLS

BACKGROUND

The present invention relates to cellular communication systems, and more particularly to cell selection in a cellular communication system.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As the mobile device moves from one cell to another, the network hands over responsibility for serving the mobile device from the presently-serving cell to the "new" cell. In this way, the user of the mobile device experiences continuity of service without having to reestablish a connection to the network. FIG. 1 illustrates a cellular communication system providing a system coverage area 101 by means of a plurality of cells 103.

In a telecommunication device such as a mobile phone/user equipment (UE) incorporating technology such as that which is in compliance with any known standards, such as the Global System for Mobile communication (GSM), Wideband Code Division Multiple Access (WCDMA), and/or the Third Generation Partnership Project's (3GPP's) Long Term Evolution (LTE), there is a need for a very precise time reference in order to be able to communicate with a base station. For this purpose, it is common to use a crystal oscillator-based (XO) circuit that provides both the UE demodulation frequency (e.g., carrier frequency) and sample rate reference. The term "crystal oscillator" is used generically throughout this document to refer to any type of crystal oscillator such as, but not limited to temperature-compensated crystal oscillators (TCXOs) and voltage-controlled crystal oscillators (VCXOs).

At various times, the generated UE demodulation frequency may be inaccurate by as much as ±17 ppm after factory calibration. This inaccuracy may be due to any or a combination of factors such as ambient temperature, aging, and inherent properties of the particular circuit or the calibration process in question. This means, for example, that when a UE tunes in to a carrier on the 2.6 GHz band, it may experience a frequency error of the received signal as large as ±45 kHz. This is too much for any message to be successfully received and decoded; generally the frequency error is required to be within plus/minus a couple of hundred Hz to allow for proper decoding of messages.

When a UE is connected to/camping on a cell, it keeps the frequency error within the range for which messages can be successfully decoded by repeatedly tuning its demodulation frequency to the carrier frequency being used by the base station. This procedure is referred to as automatic frequency correction (AFC), and is generally based on some or all of the channels below for each respective radio access technology (RAT):

GSM: Frequency Correction Channel (FCCH)
WCDMA: Synchronization Channel (SCH) and Common Pilot Channel (CPICH)
LTE: Synchronization Signal (SSIG) and Common Reference Signal (CRS)

Were the UE to stop correcting the demodulation frequency, after some while the frequency error would increase, thereby making it no longer possible to receive and successfully decode messages.

A more extensive approach is needed for the special case of the UE now being in an operational state but not having been able to tune its demodulation frequency to a cell belonging to the radio access network (e.g., when the UE is powered on after having been turned off, when the UE returns to a normal communication mode of operation after having been in a special flight-mode, or when the UE has been out-of-coverage for a while). The approach generally includes hypothesizing several frequency errors combined with so-called "cell search", and is described, for example, in the background section of Axmon et al.'s U.S. Patent Publication No. 20110103534, entitled "Frequency Synchronization Methods and Apparatus" (hereinafter "Axmon et al. document"), which was published on May 5, 2011 and which is hereby incorporated herein by reference in its entirety. This particular combination of cell search and initial AFC is sometimes referred to as "initial cell search", and is characterized by its being able to handle and identify large frequency offsets at the expense of longer processing time and/or radio time than is required for an ordinary cell search, which assumes a well-tuned UE demodulation frequency.

When the UE is searching for a first cell, it has to carry out initial cell search in order to account for frequency offsets. In case it finds a suitable or acceptable cell (herein generically referred to as a cell that is "qualified for camping"), it can camp on that cell and thereby maintain its UE demodulation frequency synchronized to the network. When it then continues to search for other cells, it can do so using the more efficient cell search technique because it does not need to account for a large demodulation frequency error.

The inventors of the subject matter described herein have recognized that existing cell searching techniques have problems. For example, if the UE is performing an ordinary cell search (i.e., as a result of the cell search being initiated when the UE's demodulation frequency synchronized to the network within acceptable limits) and encounters a cell that is unqualified for camping (e.g., a cell that the UE is not allowed to camp on for one or more reasons) then the UE has to continue searching for a qualified camping cell (e.g., suitable or acceptable). After some while, the UE will no longer be synchronized to the network, and will then have to use the initial cell search strategy when continuing the search on other carriers/bands/RATs.

As explained above, initial cell search requires substantially more time and UE resources than an "ordinary" cell search. Consequently, the more often initial cell search needs to be run, the longer it will take the UE to find a proper cell. This will have an impact on user experience and/or power consumption in some scenarios, particularly for multi-mode UEs supporting several frequency bands.

It is therefore desired to have improved cell searching strategies and apparatuses.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a user equipment in a cellular communication system. In some embodiments, such operation includes tuning a demodulation frequency of the user equipment based on signals received from a first encountered cell. A non-initial cell search procedure is used to continue searching for a qualified cell for camping on, wherein the non-initial cell search procedure relies on the demodulation frequency being within limits of accuracy that enable successful reception and decoding of received information, and wherein qualification of a cell for camping on is an indicator of whether the cell is permitted to act as a service provider to the user equipment. Prior to finding a qualified cell for camping on, information about a first discovered unqualified cell is saved, wherein the saved information enables the first discovered unqualified cell to be found. After a period of time during which the non-initial cell search procedure has been performed, the saved information about the first discovered unqualified cell is used to again tune the demodulation frequency based on reading signals from the first discovered unacceptable cell. Then, the non-initial cell search procedure is continued to be performed.

In some embodiments, tuning the demodulation frequency of the user equipment based on signals received from the first encountered cell comprises using an initial cell-search procedure to find the first encountered cell, wherein the initial cell-search procedure does not rely on the demodulation frequency being within limits of accuracy that enable successful reception and decoding of received information, and wherein the initial cell-search procedure requires more processing to perform than does the non-initial cell-search procedure; and tuning the demodulation frequency based on reading signals from the first encountered cell.

In some embodiments, operation of the user equipment includes using a timer to detect expiration of the period of time.

In some of these embodiments, the timer is initialized to a predetermined time value. The predetermined time value can, for example, represent a shorter amount of time than an amount of time that passes from when the user equipment's demodulation frequency is tuned until the demodulation frequency is no longer within limits of accuracy that enable successful reception and decoding of received information. In another example, the predetermined time value is at least in part based on one or more characteristics of a crystal oscillator from which the demodulation frequency is derived. In yet another example, the predetermined time value is at least in part based on an sensed ambient temperature of the user equipment. In still another example, the predetermined time value is at least in part based on which one of a number of frequency bands the non-initial search is being performed on.

In some embodiments, an ambient temperature of the user equipment is sensed, and the sensed ambient temperature of the user equipment is then used to control a rate at which the timer operates.

In an aspect of some embodiments, tuning the demodulation frequency based on reading signals from the first discovered unqualified cell comprises reading a master information block from the first discovered unqualified cell.

In an aspect of some embodiments, tuning the demodulation frequency based on reading signals from the first discovered unqualified cell comprises reading system information from the first discovered unqualified cell.

In an aspect of yet other embodiments, the system information from the first discovered unqualified cell is analyzed to ascertain whether the first discovered unqualified cell is now a qualified cell for camping on.

In some embodiments, tuning the demodulation frequency based on reading signals from the first discovered unqualified cell comprises reading pilot and/or synchronization signals from the first discovered unqualified cell.

In some embodiments, operation of the user equipment comprises discovering a second unqualified cell prior to finding the qualified cell for camping on; and replacing the saved information about the first discovered unqualified cell with information about the second unqualified cell, wherein the saved information enables the second discovered unqualified cell to be found.

In some of such embodiments, replacing the saved information about the first discovered unqualified cell with information about the second unqualified cell is performed only if the signals received from the second discovered unqualified cell are of higher quality than signals received from the first discovered unqualified cell, wherein higher quality is based on a comparison of one or more measured characteristics of the first and second discovered unqualified cells. For example, in some embodiments replacing the saved information about the first discovered unqualified cell with information about the second unqualified cell is performed only if the signals received from the second discovered unqualified cell are stronger than signals received from the first discovered unqualified cell.

DETAILED DESCRIPTION

Figure 1:
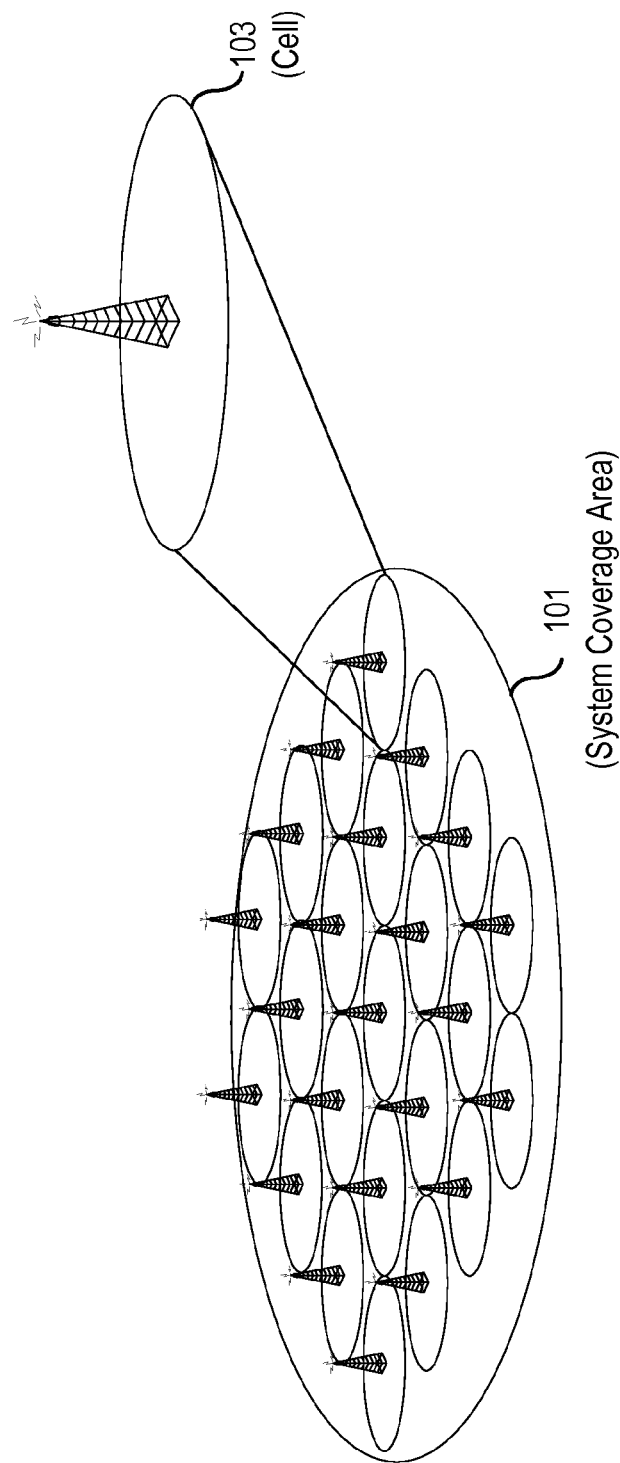
FIG. 1 illustrates a cellular communication system providing a system coverage area by means of a plurality of cells.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, when a UE encounters one or more cells that are unqualified for camping (e.g., in 3GPP parlance, "unacceptable" or "unsuitable", depending on what the UE desires to find) during an ordinary (i.e., non-initial) cell search coverage scan that is being performed after an outage, power-on, or similar event, it shall, at determinable moments, return to any of those unqualified for camping cells and run the normal AFC process in order to adjust its timing and thereby avoid losing synchronization of its demodulation frequency. The determinable moments are a function of any, some, or all of:
- hardware (e.g., crystal oscillator) characteristics (e.g., drift rate);
- ambient temperature
- age of the crystal oscillator
- frequency band These and other aspects will now be described in further detail below.

Figure 2:
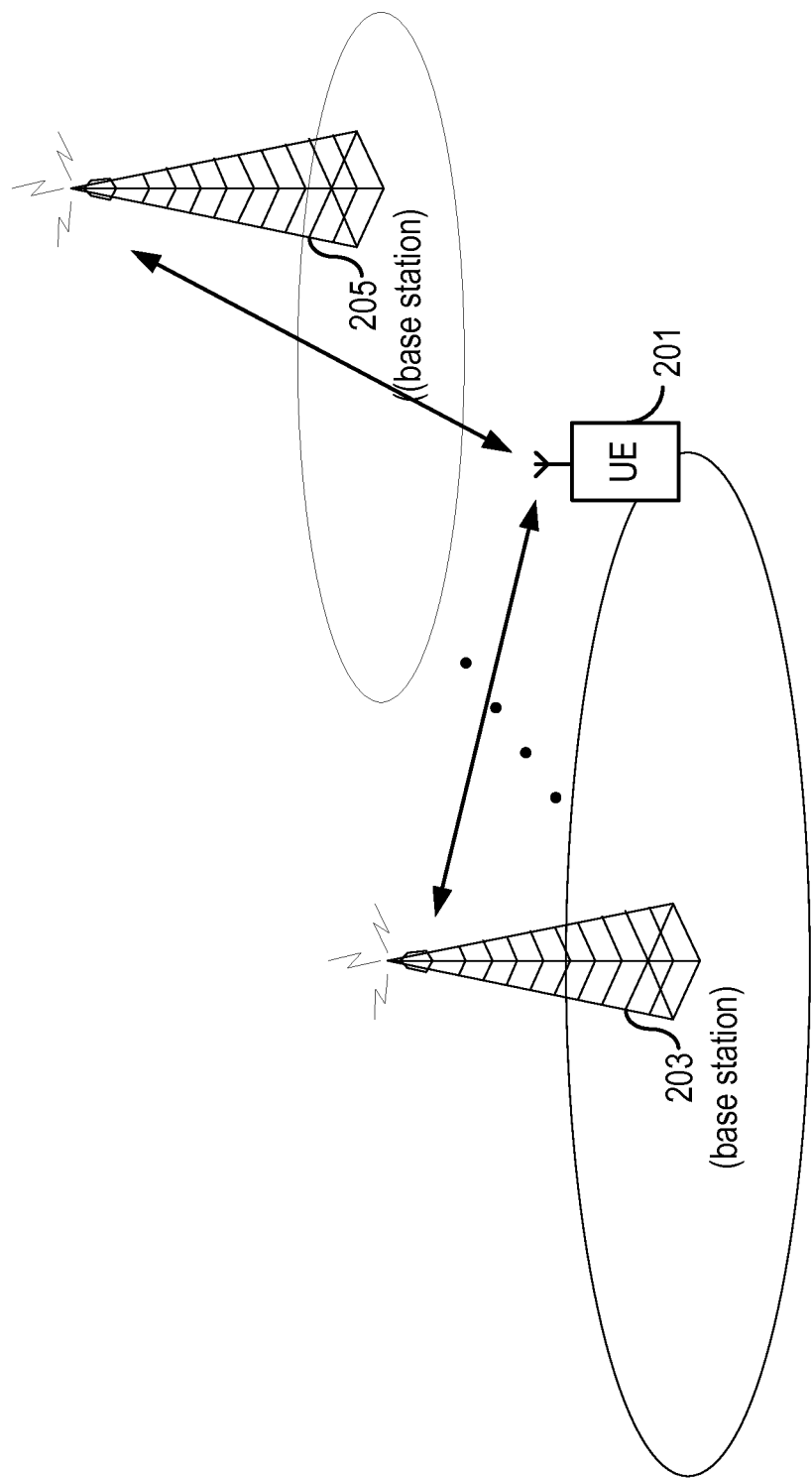
FIG. 2 illustrates a UE operating in a cellular communication system comprising a number of base stations including first and second base stations.

FIG. 2 illustrates a UE 201 operating in a cellular communication system. For the sake of example, The UE 201 at various times performs either an initial cell search or a non-initial cell search to keep apprised of what base stations are nearby (and possibly to find a base station to connect to/camp on if it is not already connected to/camped on a particular base station). For purposes of illustration, the base stations are illustrated in FIG. 2 by a first base station 203 and a second base station 205. However, the number of nearby base stations can be more or fewer than the two that are illustrated.

FIGS. 3a through 3h together constitute, in one respect, a flow chart of steps/processes performed by a UE 201 (or other mobile device) in accordance with exemplary embodiments of the invention. In another respect, FIGS. 3a through 3h together can be considered to depict exemplary means 300 comprising various circuitry configured to perform the described functions.

At the beginning, one or more frequency bands (in whole or in parts) are scanned for activity (step 301). This can be performed, for example, by means of a received signal strength indicator (RSSI) scan or a RAT scan. Such scans are known in the art. For more information, the interested reader is referred to B. Lindoff et al.'s U.S. Patent Application Publication 2011/0034168, entitled "Cell Search Method for Multi-Mode Telecommunication Apparatus, Such Apparatus, and Computer Program for Implementing the Method", which application is hereby incorporated herein by reference in its entirety.

The scan results are analyzed and based on the analysis, a first carrier that is likely to be associated with a cell is selected (step 303). This carrier is subjected to "initial cell search" (step 305). It will be recalled from the earlier discussion that the initial cell search procedure includes performance of an AFC procedure. For further details about embodiments involving LTE carriers, the interested reader can refer to the Axmon et al. document, which was cited and incorporated by reference earlier.

Metrics produced from the initial cell search (e.g., received signal strength, or quality of synchronization signals or pilot signals) are assessed (e.g., compared with threshold values) (decision block 307). If the metrics indicate that a cell has not been found ("NO" path out of decision block 307), then processing reverts back to step 303, at which point a new carrier is selected and the process is repeated.

If the initial cell search indicates (by means of the generated metrics) that a cell has been found ("YES" path out of decision block 307), then the UE reads the master information block (MIB) that is transmitted on that cell's broadcast channel (BCH) (step 309). Reading the MIB forces the UE's physical layer to fine-tune the demodulation frequency.

A test is then performed to ascertain whether the MIB read was successful (e.g., as indicated by a successful comparison between a received cyclic redundancy check (CRC) code and a freshly calculated one) (decision block 311). If the test indicates that MIB acquisition failed ("NO" path out of decision block 311), then processing reverts back to step 303, at which point a new carrier is selected and the process is repeated.

If the MIB read was successful ("YES" path out of decision block 311), a timer is started (step 313—see FIG. 3b) because the demodulation frequency has just been tuned (i.e., as part of step 309). This timer keeps track of how much time is remaining before the UE will need to synchronize to the radio access network (RAN) again in order to avoid having the frequency error of its demodulation frequency exceed the range that stills allows received messages to be successfully decoded. Other aspects relating to the timer are discussed below.

Additionally, information that enables the detected cell to be revisited, if needed, is stored in a storage device (step 315). At this point, the cell is herein referred to as a "reference cell".

With a reference cell having been set, the UE next acquires system information (SI) (step 317) to ascertain whether the UE is allowed to use the cell, at least for emergency calls. In systems that comply with the Evolved Universal Terrestrial Radio Access (Network) (E-UTRA) standard, this type of information is carried in system information block 1 (SIB1), whereas in systems that comply with the Universal Terrestrial Radio Access (UTRA) standard, it is provided in SIB3.

It is next ascertained whether the SI was accurately received (e.g., by means of a CRC check) (decision block 319), and if not ("NO" path out of decision block 319), the algorithm continues with decision block 327 (see FIG. 3c), which is described further below.

Continuing with the discussion of decision block 319, if the SI was accurately received ("YES" path out of decision block 319), the aforementioned timer is restarted (step 321) because SI acquisition causes the UE's physical layer to fine-tune the demodulation frequency, thereby rendering it well-tuned. It is next ascertained whether the reference cell is unqualified for camping (e.g., barred or otherwise not allowed to be (re) selected) (decision block 323). If the cell is not unqualified for camping (i.e., it is the type of cell that the UE is seeking to camp on) ("NO" path out of decision block 323), then the detected cell is selected (e.g., the UE will camp on/connect to this cell) (step 325), and the search ends.

Figure 3A:
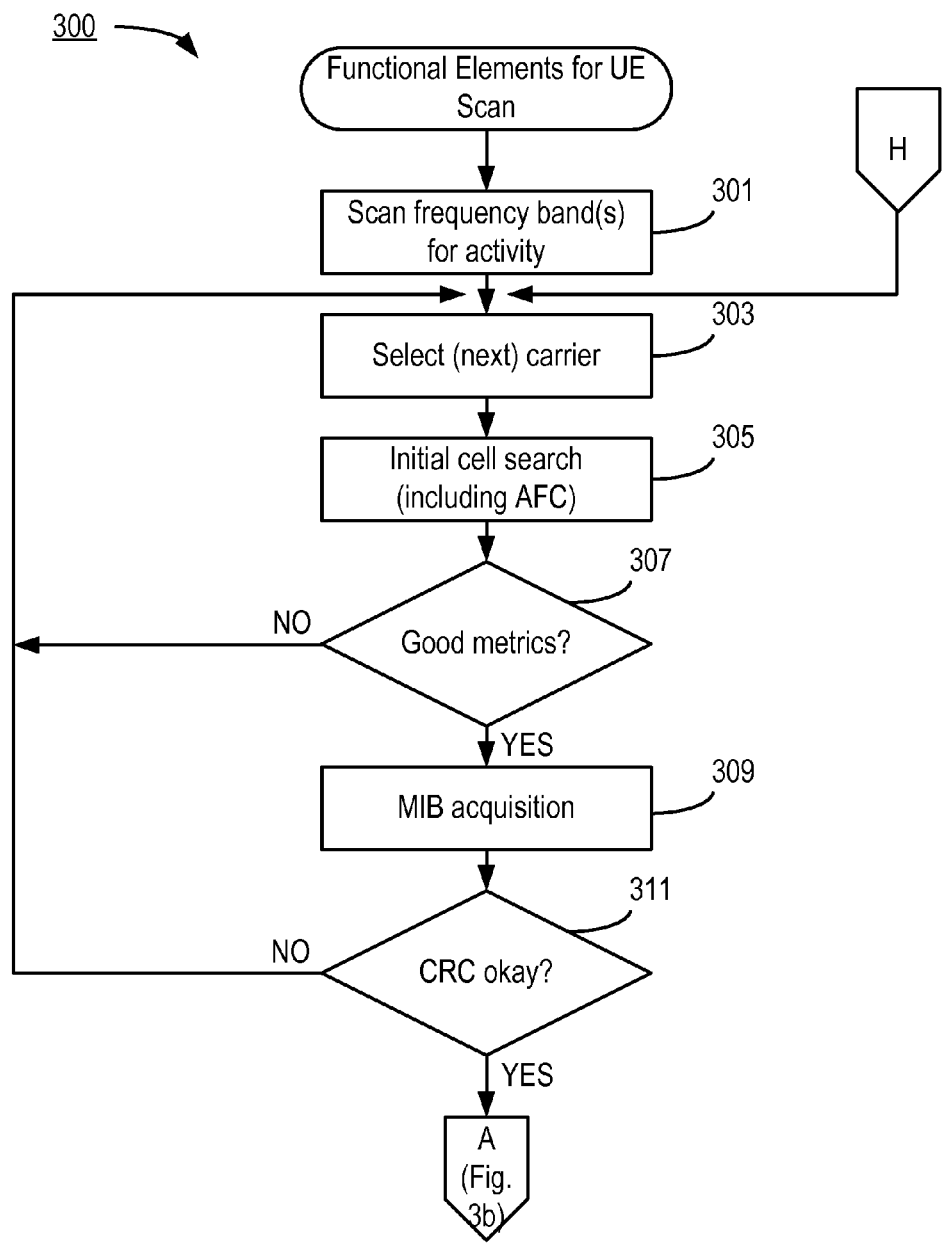
FIGS. 3a through 3h together constitute, in one respect, a flow chart of steps/processes performed by a UE (or other mobile device) in accordance with exemplary embodiments of the invention.
Figure 3B:
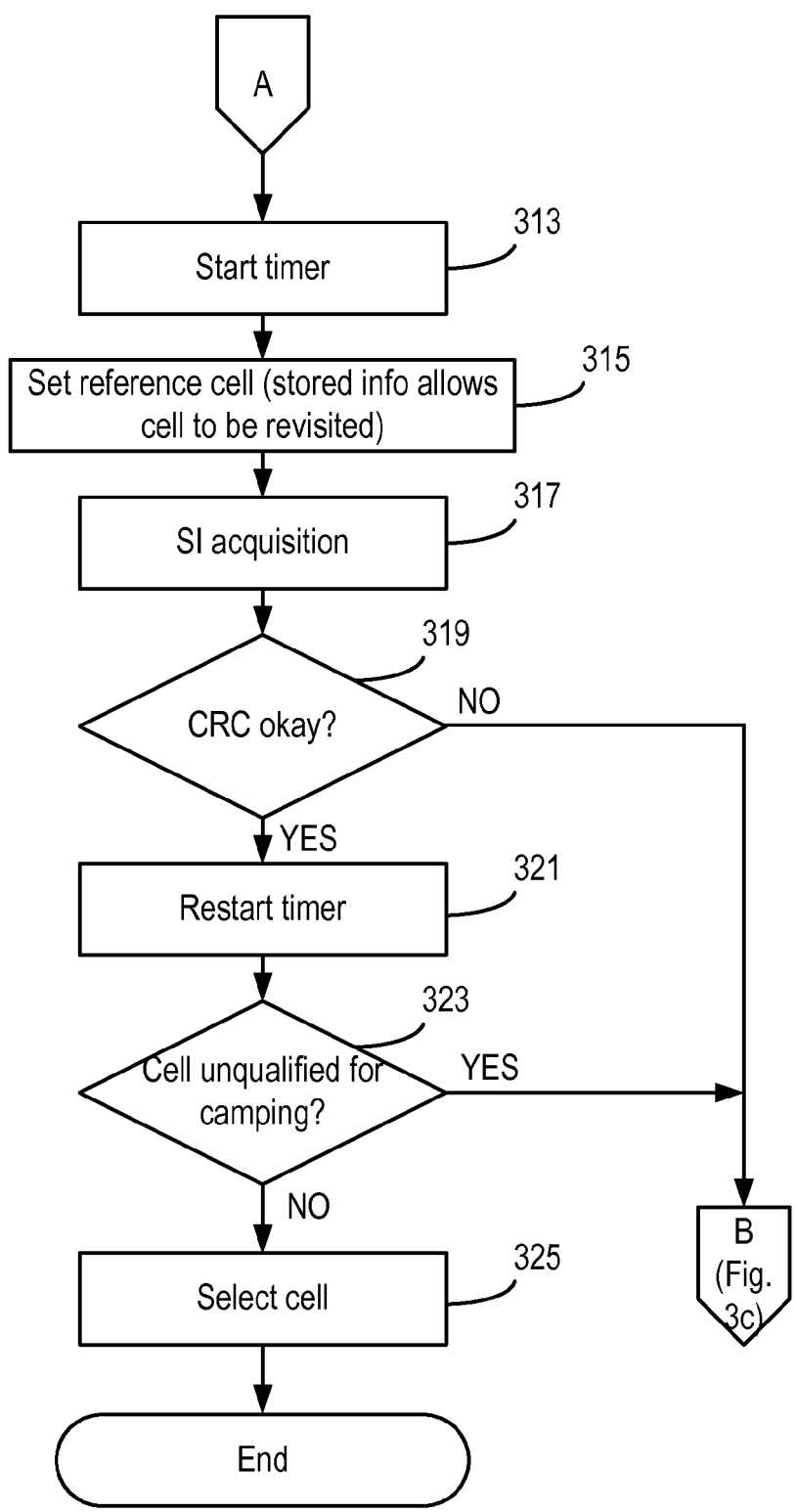
Figure 3C:
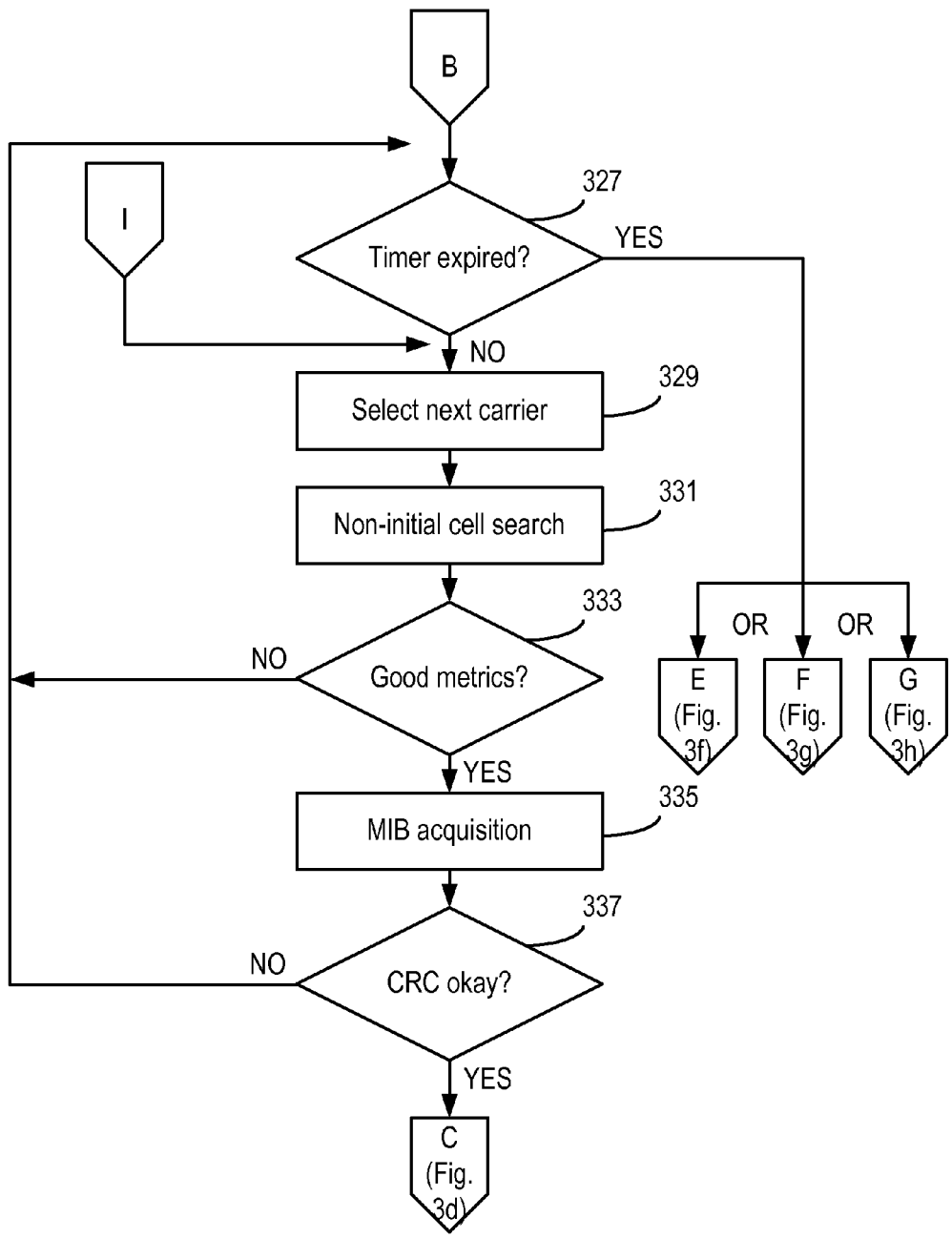
Figure 3D:
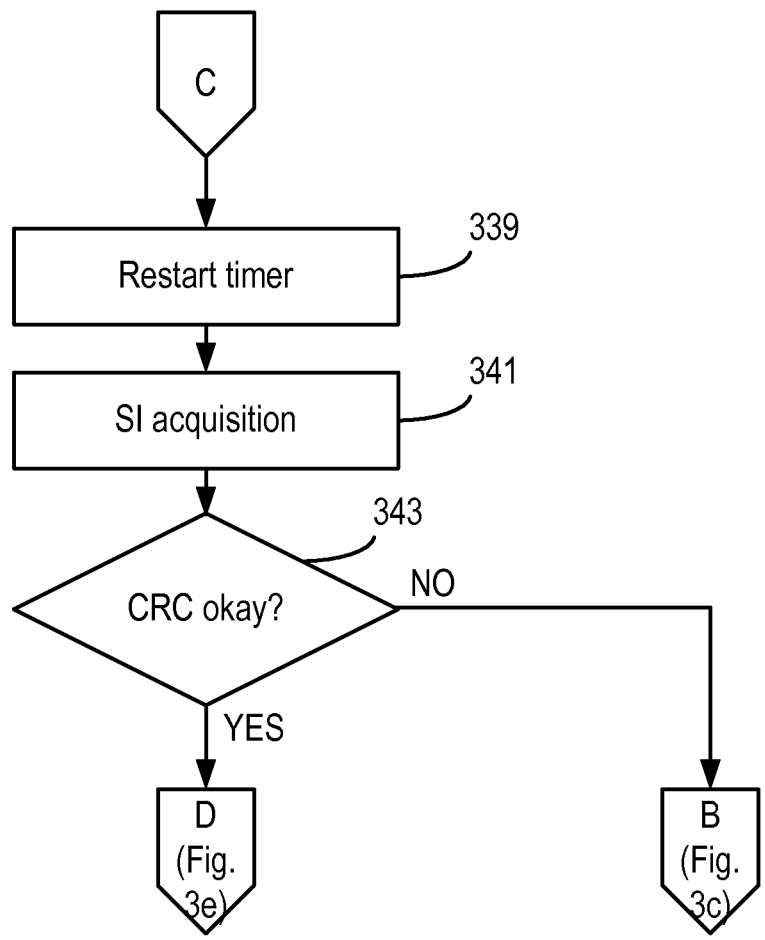
Figure 3E:
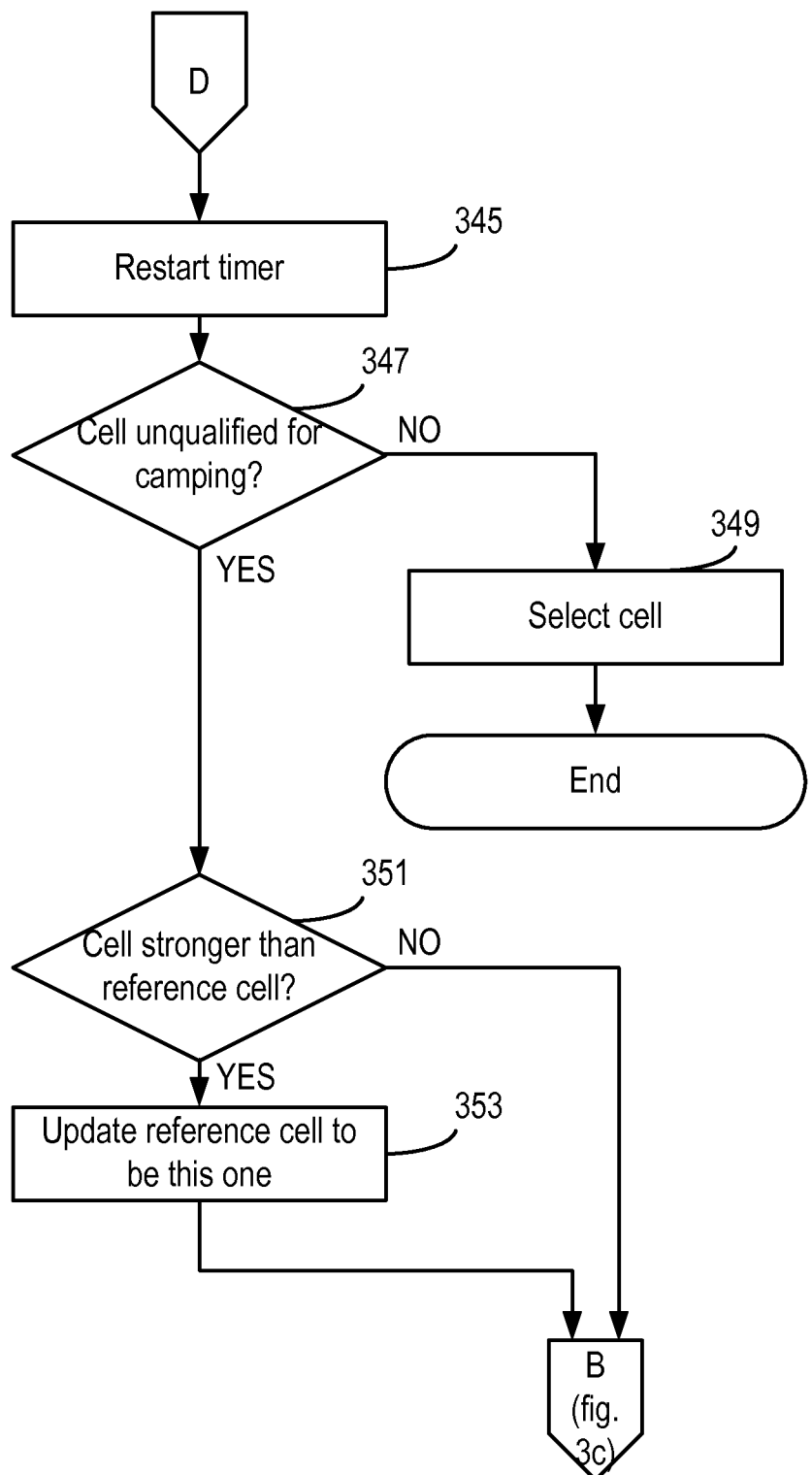

However, if the detected reference cell is unqualified for camping ("YES" path out of decision block 323), then processing continues by ascertaining whether the timer has expired (decision block 327—see FIG. 3c). If it has not ("NO" path out of decision block 327), then the UE can continue performing non-initial cell searches without needing to perform an AFC procedure. Consequently, the UE selects a next carrier (step 329) and carries out a non-initial cell search on the selected carrier (step 331). It is here noted that performing a non-initial cell search is much less laborious than carrying out an initial cell search as was performed at step 305. If the metrics generated by the cell search indicate that it is not likely that a cell has been found ("NO" path out of decision block 333), then processing returns to decision block 327, and processing proceeds as just described, beginning with a check for timer expiration.

However, if the metrics generated by the cell search indicate that it is likely that a cell has been found ("YES" path out of decision block 333), the next action is to read the MIB of this cell (step 335). A test is performed to ascertain whether the MIB has been successfully acquired (decision block 337). If not ("NO" path out of decision block 337), then processing returns to decision block 327, and processing proceeds as just described, beginning with a check for timer expiration.

If the MIB has been successfully acquired ("YES" path out of decision block 337—see FIG. 3d), the timer is restarted (step 339—see FIG. 3d) (i.e., because MIB acquisition includes the UE's physical layer fine-tuning the demodulation frequency) and system information (SI) is read (step 341) to learn whether the detected cell is qualified or unqualified for camping. A test is performed to ascertain whether the SI has been successfully acquired (decision block 343), and if not ("NO" path out of decision block 343) then processing returns to decision block 327 (see FIG. 3c), and processing proceeds as described earlier, beginning with a check for timer expiration.

However, if the SI has been successfully acquired ("YES" path out of decision block 343), then the timer is restarted (step 345—see FIG. 3e) (i.e., because SI acquisition includes the UE's physical layer fine-tuning the demodulation frequency) and the acquired information is examined to ascertain whether the detected cell is unqualified for camping (decision block 347). If not (i.e., if the cell satisfies the UE's criteria for being camped on) ("NO" path out of decision block 347), then the cell is selected (step 349) and the search is ended.

If the cell turns out to be unqualified for camping ("YES" path out of decision block 347), it is examined to ascertain whether this cell is stronger/better received than the current reference cell (decision block 351). If so ("YES" path out of decision block 351), this cell replaces the previous reference cell (step 353), and then processing returns to decision block 327 (see FIG. 3c), and processing proceeds as described earlier, beginning with a check for timer expiration. Otherwise ("NO" path out of decision block 351), processing returns to decision block 327 (see FIG. 3c) without modifying which cell is designated as the reference cell.

Figure 3F:
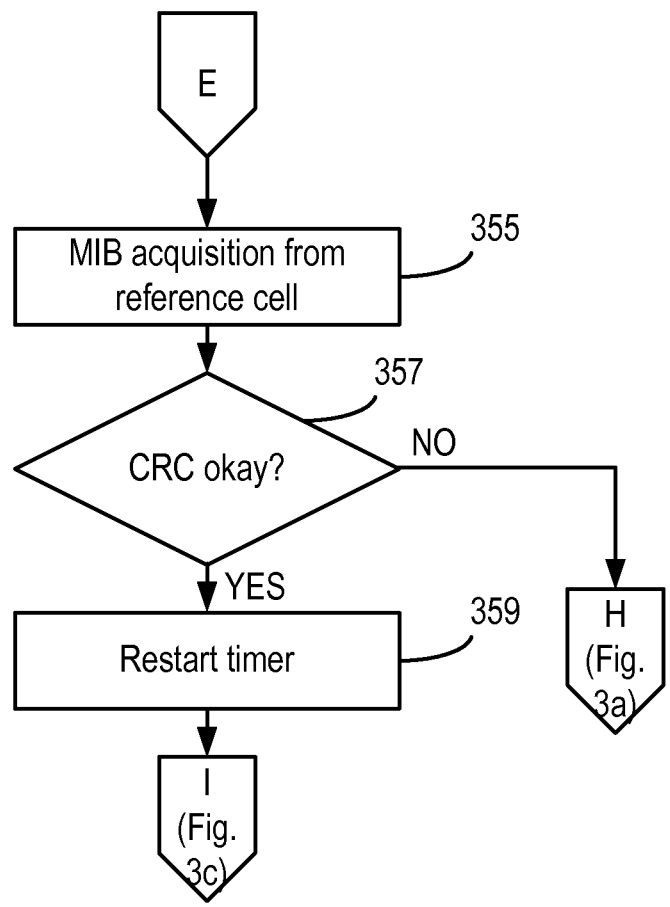

Returning now to a consideration of decision block 327, the occurrence of timer expiration ("YES" path out of decision block 327—see FIG. 3c) can be handled in any of a number of alternative ways. One of these is illustrated in FIG. 3f, and includes the UE re-reading the MIB from the cell that is designated as the reference cell (step 355). The MIB read forces the physical layer to fine-tune the demodulation frequency. This fine tuning enables the UE to avoid having to perform the more "expensive" initial AFC process for another time period.

If the MIB of the reference cell was successfully acquired (e.g., if it's CRC was okay) ("YES" path out of decision block 357), then the aforementioned timer is restarted (step 359), and processing reverts back to step 329 (see FIG. 3c) which begins with selecting a next carrier to be searched. If the MIB of the reference cell was not successfully acquired ("NO" path out of decision block 357), the processing returns to step 303 (see FIG. 3a) at which point it is assumed that the UE is no longer synchronized to the radio access network (hence "initial cell search" is performed at step 305 instead of the "non-initial cell search" called for in step 331).

It will be recognized that in the above-described alternative, the UE is enabled to continue running non-initial cell searches instead of initial cell searches for some longer amount of time as a result of the frequency correction associated with the MIB acquisition, even though the MIB is being acquired from a cell that is unqualified for camping. At this point, the purpose of this acquisition is not to try to find a cell to select (i.e., camp on/connect to) but rather just to find a way of correcting the frequency error before the error becomes so large that an initial cell search needs to be performed.

Figure 3G:
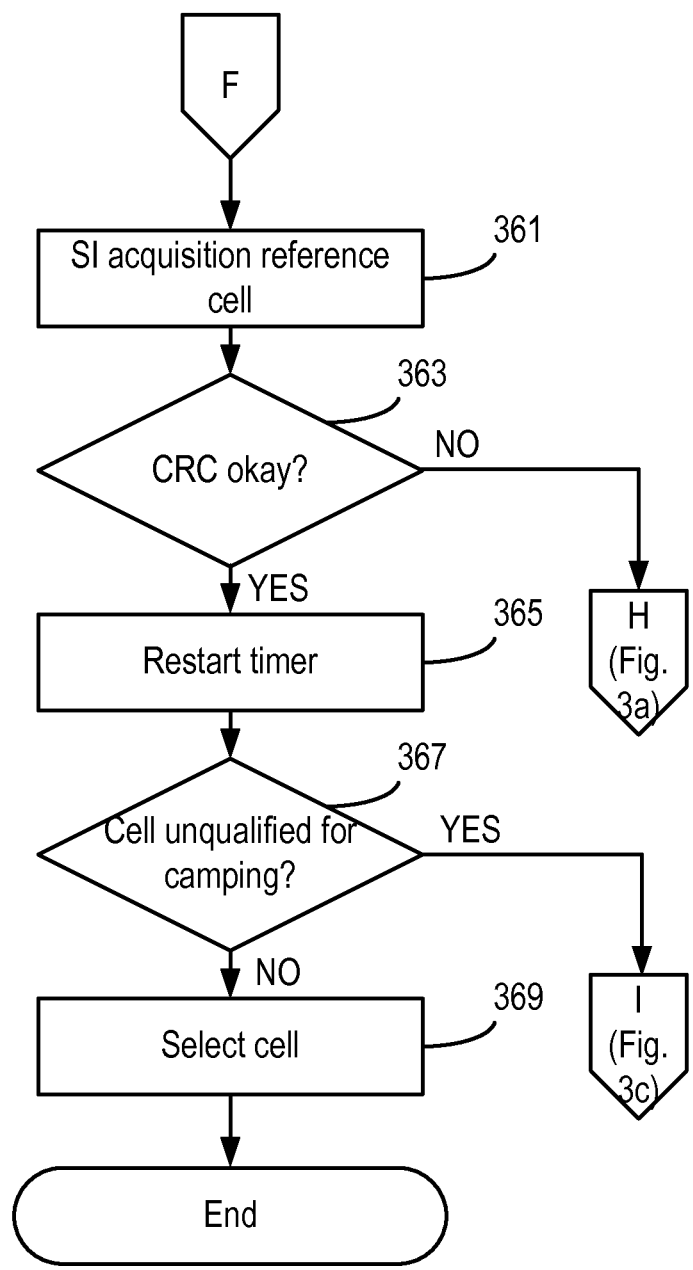

An alternative way of handling timer expiration ("YES" path of out of decision block 327) includes reading the system information from the reference cell (step 361—see FIG. 3g). The system information in this embodiment is read for the same reason that the MIB was read in the above-described embodiment, namely, to force the physical layer of the UE circuitry to fine-tune the demodulation frequency. If the system information was successfully acquired (e.g., if the CRC checked out okay) ("YES" path out of decision block 363), then the aforementioned timer is restarted 365 and the system information is checked again to see whether the reference cell is still unqualified for camping (decision block 367). If the cell is no longer barred ("NO" path out of decision block 367), then it is selected (step 369) and the search ends. Otherwise (i.e., the reference cell is still unqualified for camping) ("YES" path out of decision block 367) processing reverts back to step 329 (see FIG. 3c) at which point a next carrier is selected and the search continues.

Returning to a consideration of decision block 363 (see FIG. 3g), if the system information was not successfully acquired ("NO" path out of decision block 363), the processing returns to step 303 (see FIG. 3a) at which point it is assumed that the UE is no longer synchronized to the radio access network (hence "initial cell search" is performed at step 305 instead of the "non-initial cell search" called for in step 331).

It will be recognized that in the just described alternative, the UE is enabled to continue running non-initial cell searches instead of initial cell searches for some longer amount of time as a result of the frequency correction associated with the system information acquisition, even though the cell may or may not be an qualified for being camped on by the UE. The benefit of frequency correction (and hence additional time to run non-initial rather than initial cell searches) is gained even if the cell continues to be unqualified for camping and therefore unselectable.

Figure 3H:
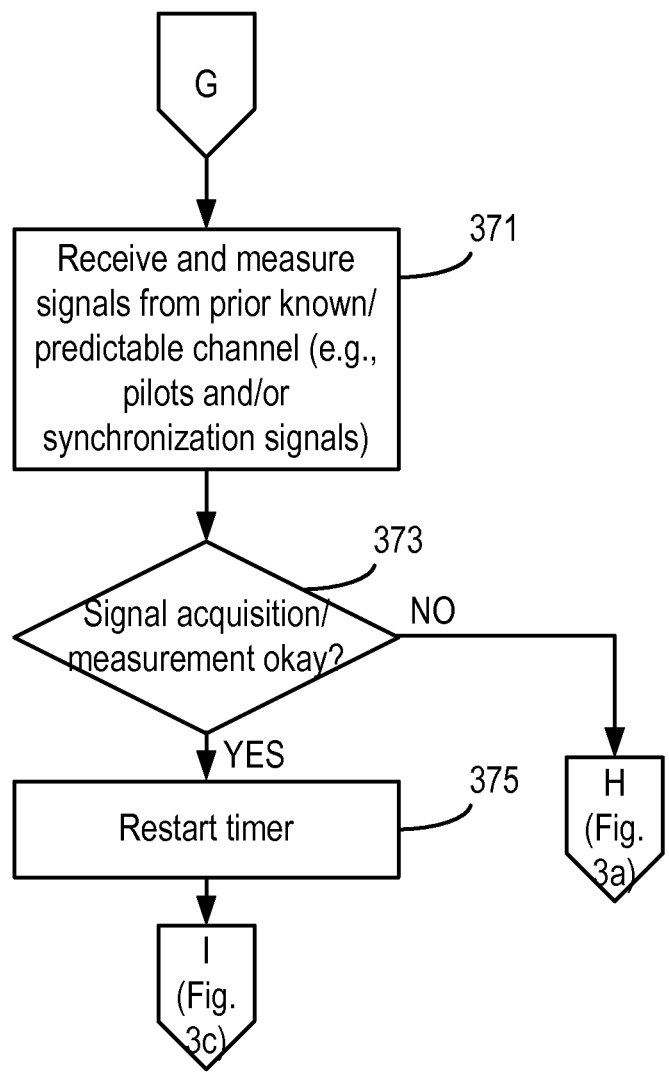

Yet another alternative way of handling timer expiration ("YES" path of out of decision block 327) includes receiving and conducting measurements on pilots and/or synchronization signals, on any other prior known or predictable channel, or any combination thereof (step 371—see FIG. 3h). This step includes the physical layer fine-tuning the demodulation frequency. The fine tuning enables the UE to avoid having to perform the more "expensive" initial AFC process for another time period.

If the signal acquisition and measurement was successful (e.g., if no errors were detected) ("YES" path out of decision block 373), then the aforementioned timer is restarted (step 375), and processing reverts back to step 329 (see FIG. 3c) which begins with selecting a next carrier to be searched. If the signal acquisition and measurement was not successful ("NO" path out of decision block 373), the processing returns to step 303 (see FIG. 3a) at which point it is assumed that the UE is no longer synchronized to the radio access network (hence "initial cell search" is performed at step 305 instead of the "non-initial cell search" called for in step 331).

It will be recognized that determining when to read/measure the predictable/prior known channel (e.g., MIB or SI from a reference cell that is (or at least previously was)

unqualified for camping) affects the level of performance because measuring (and therefore performing frequency correction) too frequently can add unnecessary overhead, but measuring too infrequently can cause initial cell searches to be run more than necessary. The timer may be set to some conservative value with respect to the particular implementation (e.g., based on characteristics of the crystal oscillator, and the like). In alternative embodiments, the timer may also be set to a value that is at least in part, a function of parameters such as but not limited to ambient temperature and/or aging and/or frequency band of operation. In an aspect of some but not necessarily all embodiments, sensing that the UE's ambient temperature has ascended to, or dropped to, a known threshold level can trigger the same functionality as would timer expiration.

In yet another aspect of some embodiments, the timer value may be made a function of ambient temperature by having the timer "tick" at a pace that is determined by ambient temperature, such that when ambient temperature increases (as measured, for example, in the modem of many embodiments), the timer clock ticks faster, thus forcing re-synchronization to the reference cell to be carried out more frequently. The timer may also be replaced by other triggers based on similar features.

In yet another aspect of some embodiments, instead of replacing the previous reference cell with a stronger and later detected cell as illustrated by steps 351-353 (see FIG. 3e), alternative embodiments can instead skip this replacement and simply keep the first reference cell detected in step 315 (see FIG. 3b).

In yet another alternative, instead of replacing the previous reference cell with a stronger and later detected cell as illustrated by steps 351-353 (see FIG. 3e), alternative embodiments can instead always designate (i.e., "set") the latest detected cell to be the reference cell (regardless of signal strength).

In yet another aspect of some alternative embodiments, before carrying out a scan such as the one illustrated by step 301 (see FIG. 3a), some embodiments including trying to detect a cell on a carrier that the UE has been connected to before (based on previously stored information).

Figure 4:
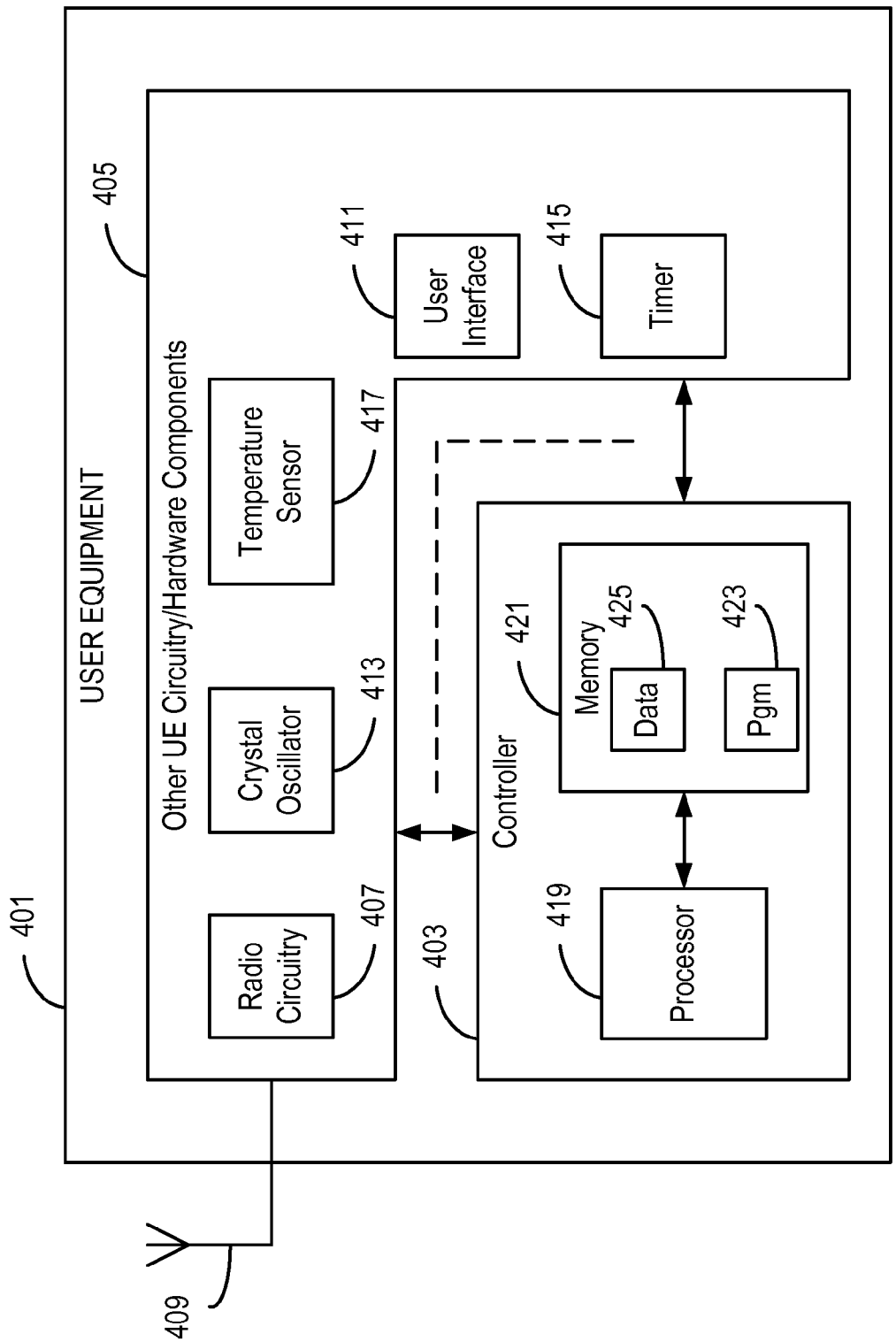
FIG. 4 is a block diagram of an exemplary UE configured to carry out various aspects of the invention.

FIG. 4 is a block diagram of an exemplary UE 401 configured to carry out various aspects of the invention. The UE 401 includes a controller 403 that generates signals for controlling other circuitry/hardware components 405 of the UE 401. The controller 403 also receives state and other information from the other circuitry/hardware components 405 as necessary to enable it to carry out its control functions.

The other circuitry/hardware components 405 include radio circuitry 407, which may vary from one embodiment to another. The radio circuitry receives and transmits radio frequency signals by means of one or more antennas, of which one antenna 409 is illustrated. The other circuitry/hardware 405 also includes one or more user interface devices 411, as are known in the art.

Of relevance to the variously described embodiments is the inclusion of a crystal oscillator 413, from which the demodulation frequency is derived. The other circuitry/hardware components also include a timer 415 that indicates when a frequency tuning process (such as any of the frequency tuning processes described above) needs to be performed before an initial cell search process will become necessary. In some but not necessarily all embodiments, the other circuitry/hardware components 405 further include a temperature sensor that can, in any of the ways described above, be used to adjust how long the timer 415 will "tick" before expiring.

The controller 403 is configured to generate control signals that cause the other circuitry/hardware components 405 to carry out processes in accordance with any of the variously described embodiments, such as but not limited to the embodiments represented by FIGS. 3a through 3h. The controller 403 may be embodied completely in the form of hard-wired circuitry (e.g., on an application specific integrated circuit—"ASIC"). Alternatively, and as illustrated in FIG. 4, the controller 403 can be embodied as a programmable processor 419, coupled to a nontransitory processor readable storage medium ("memory") 421. The memory 421 stores one or more sets of program instructions that, when executed by the processor 419, cause it to carry out any, all, or a sub-combination of the various processes described above. The memory 421 can also store data 425 for use by the processor 419 (e.g., information about the presently selected cell, and other parameters).

In yet another alternative, the controller 403 is embodied neither wholly as hardwired circuitry nor wholly as a programmable processor in combination with a suitable set of stored program instructions, but instead as some combination of both. Those of ordinary skill in the art can readily construct such embodiments, based on the description provided herein, with countless alternatives being possible.

It will be apparent that the various embodiments described herein provide advantages over prior art cell search techniques. Given that a UE generally will have to search a multitude of carriers for several RATs, power consumption as well as search time can be drastically reduced in many types of systems. To consider one such example, in LTE systems, an initial cell search on a single carrier has a worst case budget of about 21 ms radio time and 175 ms baseband processing, whereas the budget for non-initial cell search is about 16 ms radio time and 3 ms baseband processing.

To consider another example, in WCDMA systems, an initial cell search on a single carrier has a worst case budget of 630 ms radio time plus baseband processing, whereas a non-initial cell search requires only 90 ms radio time plus baseband processing.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment in a cellular communication system, the method comprising:

tuning a demodulation frequency of the user equipment based on signals received from a first encountered cell, wherein tuning the demodulation frequency causes an accuracy of the demodulation frequency to be within limits of accuracy that enable successful reception and decoding of received information;

using a non-initial cell search procedure to continue searching for a qualified cell for camping on, wherein the non-initial cell search procedure relies on the demodulation frequency being within the limits of accuracy that enable successful reception and decoding of received information, and wherein qualification of a cell for camping on is an indicator of whether the cell is permitted to act as a service provider to the user equipment;

prior to finding a qualified cell for camping on, saving information about a first discovered unqualified cell, wherein the saved information enables the first discovered unqualified cell to be found;

after a period of time during which the non-initial cell search procedure has been performed, using the saved information about the first discovered unqualified cell to again tune the demodulation frequency based on reading signals from the first discovered unqualified cell;

continuing to perform the non-initial cell search procedure; and using a timer to detect expiration of the period of time.

2. The method of claim 1, wherein tuning the demodulation frequency of the user equipment based on signals received from the first encountered cell comprises:

using an initial cell-search procedure to find the first encountered cell, wherein the initial cell-search procedure does not rely on the demodulation frequency being within limits of accuracy that enable successful reception and decoding of received information, and wherein the initial cell-search procedure requires more processing to perform than does the non-initial cell-search procedure; and tuning the demodulation frequency based on reading signals from the first encountered cell.

3. The method of claim 1, wherein the timer is initialized to a predetermined time value.

4. The method of claim 3, wherein the predetermined time value represents a shorter amount of time than an amount of time that passes from when the user equipment's demodulation frequency is tuned until the demodulation frequency is no longer within limits of accuracy that enable successful reception and decoding of received information.

5. The method of claim 3, wherein the predetermined time value is at least in part based on one or more characteristics of a crystal oscillator from which the demodulation frequency is derived.

6. The method of claim 3, wherein the predetermined time value is at least in part based on an sensed ambient temperature of the user equipment.

7. The method of claim 3, wherein the predetermined time value is at least in part based on which one of a number of frequency bands the non-initial search is being performed on.

8. The method of claim 1, comprising:

sensing an ambient temperature of the user equipment; and using the sensed ambient temperature of the user equipment to control a rate at which the timer operates.

9. The method of claim 1, wherein tuning the demodulation frequency based on reading signals from the first discovered unqualified cell comprises reading a master information block from the first discovered unqualified cell.

10. The method of claim 1, wherein tuning the demodulation frequency based on reading signals from the first discovered unqualified cell comprises reading system information from the first discovered unqualified cell.

11. The method of claim 1, comprising:

analyzing the system information from the first discovered unqualified cell to ascertain whether the first discovered unqualified cell is now a qualified cell for camping on.

12. The method of claim 1, wherein tuning the demodulation frequency based on reading signals from the first discovered unqualified cell comprises reading pilot and/or synchronization signals from the first discovered unqualified cell.

13. The method of claim 1, comprising:

prior to finding the qualified cell for camping on, discovering a second unqualified cell; and replacing the saved information about the first discovered unqualified cell with information about the second unqualified cell, wherein the saved information enables the second discovered unqualified cell to be found.

14. The method of claim 13, wherein replacing the saved information about the first discovered unqualified cell with information about the second unqualified cell is performed only if the signals received from the second discovered unqualified cell are of higher quality than signals received from the first discovered unqualified cell, wherein higher quality is based on a comparison of one or more measured characteristics of the first and second discovered unqualified cells.

15. The method of claim 14, wherein replacing the saved information about the first discovered unqualified cell with information about the second unqualified cell is performed only if the signals received from the second discovered unqualified cell are stronger than signals received from the first discovered unqualified cell.

16. An apparatus in a user equipment in a cellular communication system, the apparatus comprising:

circuitry configured to tune a demodulation frequency of the user equipment based on signals received from a first encountered cell, wherein tuning the demodulation frequency causes an accuracy of the demodulation frequency to be within limits of accuracy that enable successful reception and decoding of received information;

circuitry configured to use a non-initial cell search procedure to continue searching for a qualified cell for camping on, wherein the non-initial cell search procedure relies on the demodulation frequency being within the limits of accuracy that enable successful reception and decoding of received information, and wherein qualification of a cell for camping on is an indicator of whether the cell is permitted to act as a service provider to the user equipment;

circuitry configured to save information about a first discovered unqualified cell prior to finding a qualified cell for camping on, wherein the saved information enables the first discovered unqualified cell to be found;

circuitry configured to perform, after a period of time during which the non-initial cell search procedure has been performed, using the saved information about the first discovered unqualified cell to again tune the demodulation frequency based on reading signals from the first discovered unqualified cell;

circuitry configured to cause continued performance of the non-initial cell search procedure; and a timer that generates a timer expiration indicator that indicates expiration of the period of time.

17. The apparatus of claim 16, wherein the circuitry configured to tune the demodulation frequency of the user equipment based on signals received from the first encountered cell comprises:

circuitry configured to use an initial cell-search procedure to find the first encountered cell, wherein the initial cell-search procedure does not rely on the demodulation frequency being within limits of accuracy that enable successful reception and decoding of received information, and wherein the initial cell-search procedure requires more processing to perform than does the non-initial cell-search procedure; and circuitry configured to tune the demodulation frequency based on reading signals from the first encountered cell.

18. The apparatus of claim 16, comprising circuitry configured to initialize the timer to a predetermined time value.

19. The apparatus of claim 18, wherein the predetermined time value represents a shorter amount of time than an amount of time that passes from when the user equipment's demodulation frequency is tuned until the demodulation frequency is no longer within limits of accuracy that enable successful reception and decoding of received information.

20. The apparatus of claim 18, wherein the predetermined time value is at least in part based on one or more characteristics of a crystal oscillator from which the demodulation frequency is derived.

21. The apparatus of claim 18, wherein the predetermined time value is at least in part based on an sensed ambient temperature of the user equipment.

22. The apparatus of claim 18, wherein the predetermined time value is at least in part based on which one of a number of frequency bands the non-initial search is being performed on.

23. The apparatus of claim 16, comprising:
a sensor that senses an ambient temperature of the user equipment; and
circuitry configured to use the sensed ambient temperature of the user equipment to control a rate at which the timer operates.

24. The apparatus of claim 16, wherein the circuitry configured to tune the demodulation frequency based on reading signals from the first discovered unqualified cell comprises circuitry configured to read a master information block from the first discovered unqualified cell.

25. The apparatus of claim 16, wherein the circuitry configured to tune the demodulation frequency based on reading signals from the first discovered unqualified cell comprises circuitry configured to read system information from the first discovered unqualified cell.

26. The apparatus of claim 16, comprising:
circuitry configured to analyze the system information from the first discovered unqualified cell to ascertain whether the first discovered unqualified cell is now a qualified cell for camping on.

27. The apparatus of claim 16, wherein the circuitry configured to tune the demodulation frequency based on reading signals from the first discovered unqualified cell comprises circuitry configured to read pilot and/or synchronization signals from the first discovered unqualified cell.

28. The apparatus of claim 16, comprising:
circuitry configured to discover a second unqualified cell prior to finding the qualified cell for camping on; and
circuitry configured to replace the saved information about the first discovered unqualified cell with information about the second unqualified cell, wherein the saved information enables the second discovered unqualified cell to be found.

29. The apparatus of claim 28, wherein the circuitry configured to replace the saved information about the first discovered unqualified cell with information about the second unqualified cell is activated only if the signals received from the second discovered unqualified cell are of higher quality than signals received from the first discovered unqualified cell, wherein higher quality is based on a comparison of one or more measured characteristics of the first and second discovered unqualified cells.

30. The apparatus of claim 29, wherein the circuitry configured to replace the saved information about the first discovered unqualified cell with information about the second unqualified cell is activated only if the signals received from the second discovered unqualified cell are stronger than signals received from the first discovered unqualified cell.

* * * * *